US011932516B2

(12) United States Patent
Hänsler

(10) Patent No.: US 11,932,516 B2
(45) Date of Patent: Mar. 19, 2024

(54) SPRING LIFTING DEVICE FOR A CRANE

(71) Applicant: LIEBHERR-WERK BIBERACH GMBH, Biberach an der Riss (DE)

(72) Inventor: Andreas Hänsler, Eberhardzell (DE)

(73) Assignee: LIEBHERR-WERK BIBERACH GMBH, Biberach an der Riss (DE)

( * ) Notice: Subject to any disclaimer, the term of this patent is extended or adjusted under 35 U.S.C. 154(b) by 766 days.

(21) Appl. No.: 16/982,268

(22) PCT Filed: Mar. 14, 2019

(86) PCT No.: PCT/EP2019/056391
§ 371 (c)(1),
(2) Date: Jan. 5, 2021

(87) PCT Pub. No.: WO2019/179870
PCT Pub. Date: Sep. 26, 2019

(65) Prior Publication Data

US 2021/0139289 A1 May 13, 2021

(30) Foreign Application Priority Data

Mar. 21, 2018 (DE) ..................... 10 2018 106 729.1

(51) Int. Cl.

| | |
|---|---|
| ***B66C 1/30*** | (2006.01) |
| ***B66C 1/34*** | (2006.01) |
| ***B66C 1/40*** | (2006.01) |
| ***B66D 3/04*** | (2006.01) |
| *B66C 1/36* | (2006.01) |

(52) U.S. Cl.
CPC .................. *B66C 1/34* (2013.01); *B66C 1/40* (2013.01); *B66D 3/04* (2013.01); *B66C 1/36* (2013.01)

(58) Field of Classification Search
CPC .... B66C 1/34; B66C 1/36; B66C 1/40; B66C 1/46; B66C 1/122; B66C 3/04
See application file for complete search history.

(56) References Cited

U.S. PATENT DOCUMENTS

| | | | | |
|---|---|---|---|---|
| 1,713,586 A | | 5/1929 | Wright | |
| 2,576,261 A | * | 11/1951 | Minor | E21B 19/04 294/82.16 |
| 2,613,981 A | * | 10/1952 | Minor | E21B 19/04 294/82.1 |
| 2,664,175 A | * | 12/1953 | Hertel | E21B 19/04 292/210 |

(Continued)

FOREIGN PATENT DOCUMENTS

| | | |
|---|---|---|
| CN | 204138162 U | 2/2015 |
| CN | 204980812 U | 1/2016 |

(Continued)

*Primary Examiner* — Emmanuel M Marcelo
(74) *Attorney, Agent, or Firm* — Dilworth & Barrese, LLP

(57) ABSTRACT

The present invention relates to a lifting device for a crane which comprises a lifting cable winch, a lifting cable and a load-receiving means (10), the load-receiving means (10) being connected to the lifting cable and being movable by means of the lifting cable winch, in particular vertically movable. According to the invention the lifting device has at least one spring mounting (12) so that on the whole the load to be lifted and received by the load-receiving means (10) is mounted in a sprung manner.

14 Claims, 4 Drawing Sheets

(56) References Cited

U.S. PATENT DOCUMENTS

| | | | | | | |
|---|---|---|---|---|---|---|
| 2,980,400 | A | * | 4/1961 | Long | B66C 1/34 | 294/82.16 |
| 3,032,364 | A | * | 5/1962 | Phillips | E21B 19/04 | 294/82.16 |
| 3,037,803 | A | * | 6/1962 | Phillips | E21B 19/02 | 294/82.16 |
| 3,278,163 | A | * | 10/1966 | Marks | E21B 19/04 | 254/401 |
| 3,434,696 | A | * | 3/1969 | Brackin | B66C 1/34 | 294/82.16 |
| 3,512,657 | A | | 5/1970 | Chambers | | |
| 3,612,596 | A | * | 10/1971 | Brackin | B66C 1/34 | 254/409 |
| 3,621,756 | A | | 11/1971 | Ulbing | | |
| 3,792,787 | A | | 2/1974 | Maloney | | |
| 3,894,476 | A | | 7/1975 | Cobb | | |
| 4,112,750 | A | | 9/1978 | Murakami | | |
| 4,153,123 | A | * | 5/1979 | Bereyziat | G01G 19/16 | 177/208 |
| 4,438,910 | A | * | 3/1984 | McFadden | B66C 1/34 | 188/282.8 |
| 7,980,610 | B2 | | 7/2011 | Claraz et al. | | |
| 2017/0152042 | A1 | | 6/2017 | Stucki et al. | | |
| 2020/0062553 | A1 | * | 2/2020 | Toon | B66C 1/36 | |

FOREIGN PATENT DOCUMENTS

| | | | | | |
|---|---|---|---|---|---|
| CN | 204980850 | U | | 1/2016 | |
| CN | 206088800 | U | | 4/2017 | |
| CN | 106698205 | A | | 5/2017 | |
| CN | 107458960 | A | | 12/2017 | |
| CN | 107500171 | A | | 12/2017 | |
| CN | 107601296 | A | | 1/2018 | |
| CN | 110077957 | A | * | 8/2019 | B66C 1/36 |
| DE | 1021994 | B | | 1/1958 | |
| DE | 1118943 | B | | 12/1961 | |
| DE | 2133813 | A1 | | 1/1973 | |
| DE | 3438985 | A1 | | 4/1986 | |
| DE | 202006016043 | U1 | | 2/2008 | |
| DE | 102008024358 | A1 | | 12/2009 | |
| FR | 2414192 | A2 | | 8/1979 | |
| GB | 24244 | A | | 11/1903 | |
| GB | 1599023 | A | * | 9/1981 | B66C 1/40 |
| WO | 2014/098568 | A1 | | 6/2014 | |

* cited by examiner

SPRING LIFTING DEVICE FOR A CRANE

BACKGROUND OF THE INVENTION

The present invention relates to a lifting device for a crane in accordance with the description herein.

Lifting devices for cranes are known in a variety of variants from the prior art. Huge maximum forces can arise when raising and placing down a load by means of the lifting device of a crane. They can also produce substantial dynamic effects on the total support or crane structure in addition to damage to the load to be lifted and to the ground. High and abrupt strains and movements (e.g. oscillating) on the total crane structure can arise here, whereby the long-term strength and the handling of the operation the crane are negatively influenced.

Attempts are typically made to avoid the above-named problems by slowed-down raising and placing down procedures of the load that are implement by a corresponding adaptation of the lifting speed. However, such an adaptation has to be actively carried out by an operator, which requires a high degree of experience and a sure instinct. There is therefore generally the risk that the adaptation of the lifting speed to avoid force peaks is not correctly performed and damage to the load, to the crane structure, and/or to the ground can arise.

SUMMARY OF THE INVENTION

It is therefore the underlying object of the present invention to further develop lifting devices for cranes such that force peaks are minimized during the lifting process and a simple operation of the lifting device is simultaneously ensured.

This object is achieved in accordance with the invention by the combination of the features herein. A lifting device for a crane is accordingly provided that comprises a hoist rope winch, a hoist rope, and a load suspension means, wherein the load suspension means is connected to the host rope and is travelable, in particular vertically travelable, by means of the hoist rope winch. In accordance with the invention, the lifting device is characterized in that it has at least one spring mounting for the cushioning of a load taken up by the load suspension means. I.e. at least one element of the lifting device is spring mounted.

A gentle or smooth operation of the crane is made possible by the use of a spring mounting between the load and the crane construction supporting the lifting device during the lifting process, in particular during the taking up and placing down of the load, whereby potentially damaging force peaks are minimized. Potential shocks or force peaks are intercepted by the spring mounting here and are not led into the crane construction, which has a positive effect on the service life of the crane construction. In addition, movements, in particular oscillations, of the crane caused by the lifting movement are minimized, which is above all significant with regard to ever greater weight reductions of the crane constructions by the use of lightweight structures.

At the same time, a simplified operation without any additional technical effort, for example in the crane control, is possible, while the demands on the operator are substantially reduced. The considerably simpler operation is in particular of advantage for inexperienced users since an erroneous operation during the lifting procedure is practically precluded. The safety of crane operation is thus increased while nothing changes in the crane handling.

The present invention can also be used in combination with existing cranes and lifting devices and can be retrofitted without problem by attaching the spring mounting in accordance with the invention.

The term lifting procedure here comprises the placing down, raising, and traveling of a load by means of the lifting device. The term crane is used in the general sense in the present case as an apparatus for a vertical and/or horizontal handling of loads.

Advantageous embodiments of the invention result from the description herein.

Provision is made in an embodiment that the load suspension means comprises a hook block and a lifting hook, wherein the lifting hook is connected to the hook block via the spring mounting. This represents a particularly simple solution since only the mounting of the lifting hook at or in the hook block has to be replaced with the spring mounting in accordance with the invention. A retrofitting of existing cranes or lifting devices can be carried out without problem, fast, and inexpensively.

Provision is made in a further embodiment that the spring mounting is arranged at or in the hook block. Individual elements of the hook block such as the rope sheaves or a crossbeam connecting a plurality of upper parts of the hook block can thus be spring mounted.

Provision is made in a further embodiment that the spring mounting is arranged at a hoist rope anchor, in particular at a fastening point of the hoist rope at the hoist rope winch, at the load suspension means, or at the crane structure. Provision is made in a further embodiment that that a swivel is furthermore provided, with the spring mounting being arranged at or in the swivel.

Provision is made in a further embodiment that the spring mounting can be fixed by a latching mechanism, for example by a bolt. The spring mounting can thereby be deactivated in certain situations, whereby the lifting device in accordance with the invention behaves like a lifting device of the category. The latching mechanism can here be controlled manually or also automatically by an actuator.

Provision is made in a further embodiment that the spring mounting comprises a mechanical spring, an air cushioning, or a hydraulic cushioning.

Provision is made in a further embodiment that the spring mounting comprises a sensor for detecting the weight and/or a display of the weight of the load taken up by the load suspension means. The relative distance of the parts connected by the spring mounting or, with a mechanical spring mounting, the deformation of the spring produced by the load can thus be used for a measurement or for a display of the weight force of the load.

Provision is made in a further embodiment that the spring mounting is arranged at the hoist rope winch, with the hoist rope winch preferably being connectable to a crane structure of the crane and with the spring mounting being arranged between the hoist rope winch and the crane structure in the fastened state. The hoist rope winch is therefore spring cushioned in this embodiment.

It is also conceivable that a plurality of elements of the lifting device in accordance with the invention are simultaneously spring mounted.

The present invention further relates to a crane having a lifting device in accordance with the invention in accordance with one of the previously described embodiments. The same advantages and properties obviously result for such a crane as for the lifting device in accordance with the invention so that a repeat description will be dispensed with at this point.

BRIEF DESCRIPTION OF THE DRAWINGS

Further features, details, and advantages of the invention result from the embodiments explained with reference to the Figures. There are shown.

DESCRIPTION OF THE PREFERRED EMBODIMENTS

Figure 1:
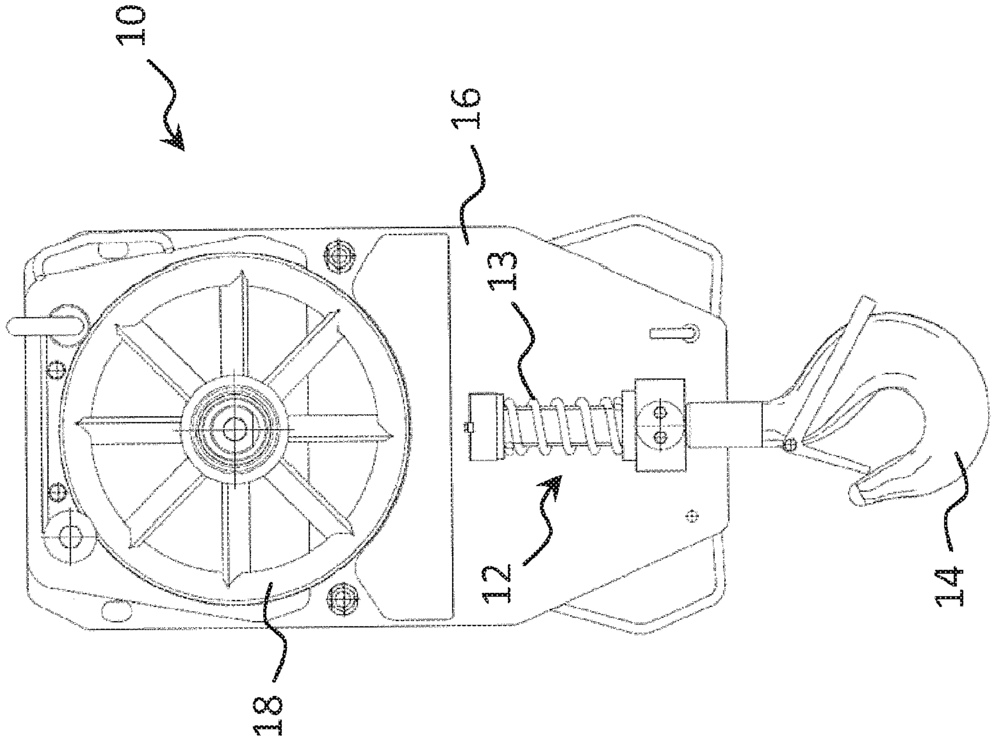
FIG. 1: a first embodiment of the load suspension means of the lifting device in accordance with the invention in a lateral cross-sectional view.
Figure 2:
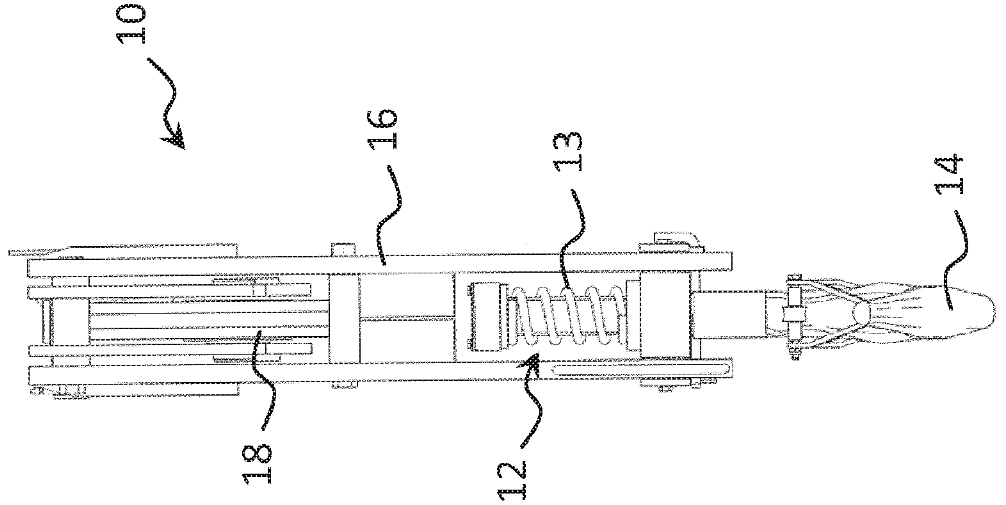
FIG. 2: the load suspension means in accordance with FIG. 1 in a frontal cross-sectional view.

A first embodiment of the load suspension means 10 of the lifting device in accordance with the invention is shown in FIGS. 1 and 2, in each case shown in a lateral and frontal cross-sectional view, with the respective cover disposed at the top in a plan view being removed. The load suspension means 10 is a hook block such as is used with various crane types and comprises a hook block body 16 in which a rope sheave 18 and a lifting hook 14 are supported. A hoist rope of the crane is reeved (not shown) in the rotatably supported rope sheave 18 during operation, said hoist rope being able to be retracted and extended by means of a hoist rope winch (not shown), whereby the hook block 10 is traveled vertically. A load to be raised can be taken up by the lifting hook.

Unlike hook blocks of the category, the lifting hook 14 of the hook block 10 of the lifting device in accordance with the invention is supported in the hook block body 16 via a spring mounting 12. A cushioned suspension of the load to be lifted results due to the spring mounting of the lifting hook 14, whereby force peaks, such as in particular arise on the raising and placing down of the load from and onto the ground, are minimized. The spring mounting 12 intercepts such force peaks so that they are not led into the crane construction. The spring mounting 12 in this embodiment is implemented by a mechanical spring 13 that is compressed by the weight force of the lifting hook 14 and the load (not shown) fastened thereto. The spring force of the spring mounting 12 therefore counteracts the weight force of the load.

The introduced force of the hoisting gear driving the hoist rope winch on the raising of the load is led into the spring 13 due to the counteracting weight force of the load to be raised due to the spring mounting of the lifting hook 14. Once the required force to overcome the weight force has been reached, the load rises from the ground. This force, that corresponds in amount to the weight force of the load to be overcome, is "stored" in the spring during the lifting. This time delayed process of the force introduction has a gentle effect on the crane construction and results in a damping of force peaks.

When placing down the load, the energy "stored" in the deformation of the spring 13 degrades in the time period between the first contact of the load with the ground and the complete relaxation of the spring 13 in accordance with the speed of placing down. The crane construction thereby relaxes comparatively slowly from the tensioned state that has been adopted during the lifting of the load. The forces acting on the load and the ground are also adopted more slowly and thus more gently than with conventional lifting devices that do not provide any spring mountings 12. A hard impact of the load on the ground is effectively avoided by the lifting device in accordance with the invention.

Provision can alternatively be made that the time in which the spring mounting 12 is tensioned or relaxed is used to correct or adapt the positioning of the crane or of specific crane elements, e.g. the trolley or the slewing gear. An oscillation of the load during raising caused by diagonal pull can thereby in particular be considerably reduced.

The previously described advantages are not restricted to a spring mounting of the lifting hook 14 or to the use of a mechanical spring 13. Such a behavior of the lifting device in accordance with the invention can thus likewise be achieved with other cushioning mechanisms, for example with an air cushioning or hydraulic cushioning. The spring mounting 12 can likewise be arranged at a different point of the lifting device or a plurality of spring mountings 12, 12', 12" can be used simultaneously. It is decisive for the advantageous effect of the present invention that at least one spring mounting 12 is arranged between the load and the crane construction so that a cushioned support of the load results overall during the lifting. The spring mounting 12 can likewise be designed as rotatable so that the parts connected by the spring mounting 12 can rotate with respect to one another. However, a lockable or rotationally rigid spring mounting 12 is also conceivable.

Figure 3:
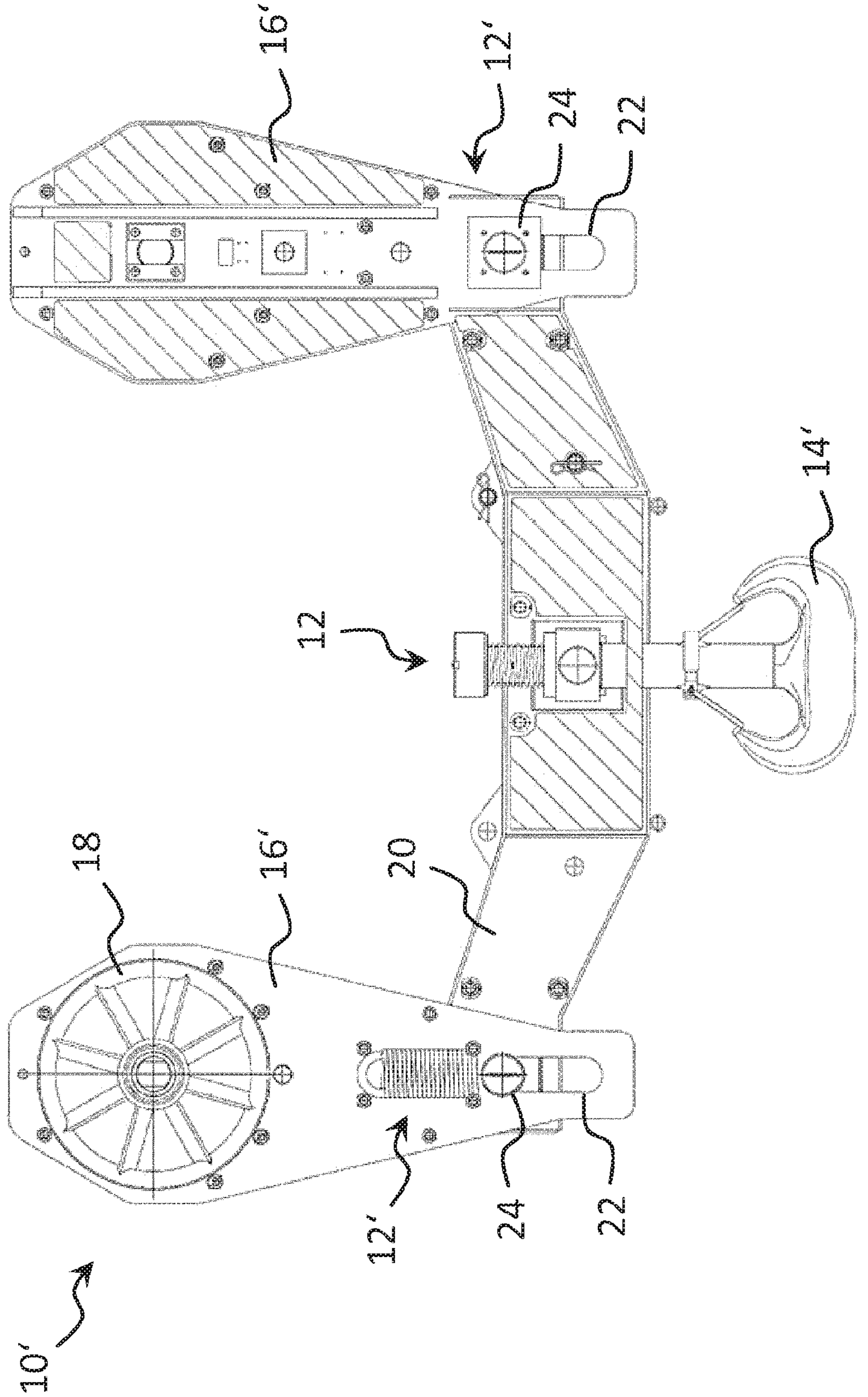
FIG. 3: a second embodiment of the load suspension means of the lifting device in accordance with the invention in a lateral cross-sectional view.

A second embodiment of a hook block 10' of the lifting device in accordance with the invention is shown in a lateral cross-sectional view in FIG. 3. The hook block 10' has two hook block bodies 16' in which a respective rope sheave 18 is rotatably supported and which are connected to one another by a crossbeam 20. The cover of the left hand hook block body 16' and of the left hand part of the crossbeam 20 disposed at the top in plan view are removed in FIG. 3. The lifting hook 14' is supported on or in the crossbeam 20 via a spring mounting 12. The crossbeam 20 is in turn vertically displaceably supported at its two ends in elongate holes 22 of the two hook block bodies 16' via bolts 24. Respective further spring mountings 12' are arranged between the crossbeam 20 and the hook block bodies 16'. The crossbeam 20 is therefore also spring cushioned in the hook block bodies 16' beside the spring mounting of the lifting hook 14' in the crossbeam 20.

Figure 4:
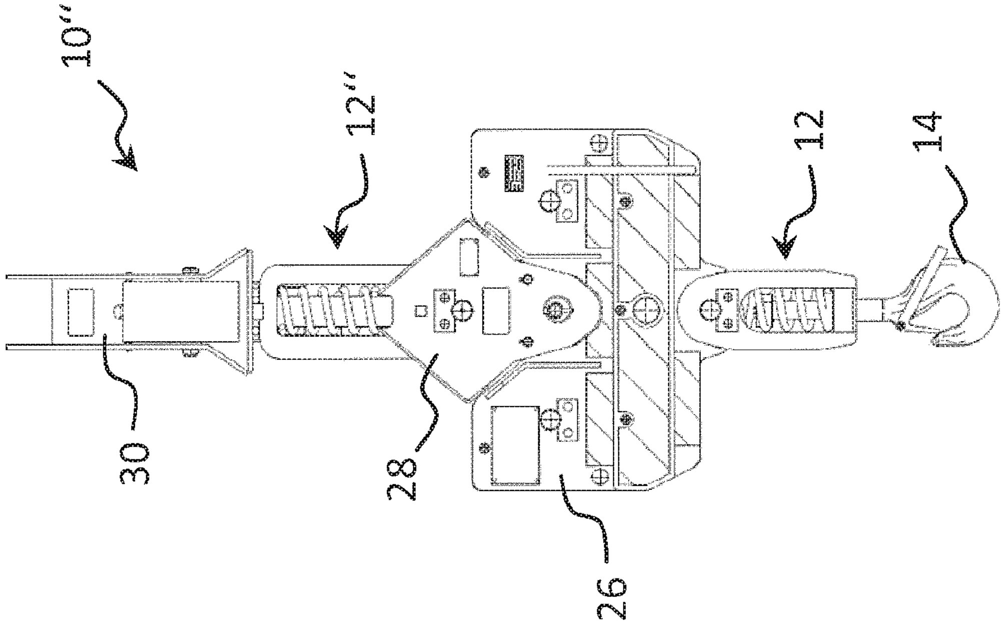
FIG. 4: a third embodiment of the load suspension means of the lifting device in accordance with the invention in a side view.
Figure 5:
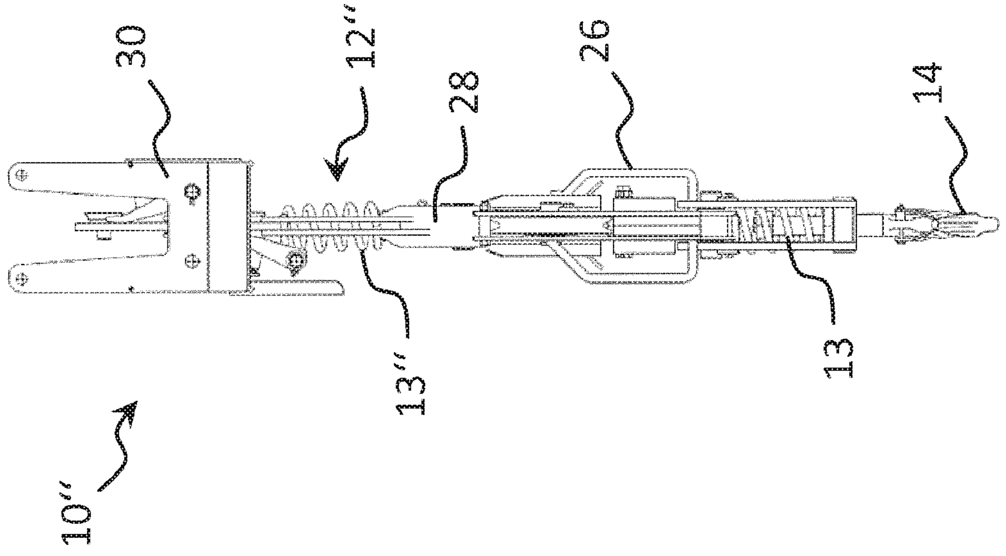
FIG. 5: the load suspension means in accordance with FIG. 4 in a frontal cross-sectional view.

A third embodiment of a hook block 10" of the lifting device in accordance with the invention is shown in a lateral cross-sectional view in FIGS. 4 and 5. The hook block 10" comprises a lower, a middle, and an upper hook block part 26, 28, 30. The upper hook block part 30 is connected to the crane construction, for example via a trolley (not shown) displaceable along the crane boom. The middle hook block part 28 is connected to the upper hook block part 30 via a spring mounting 12" and is thus cushioned. Respective rope sheaves 18 in which the hoist rope is reeved according to the pulley block principle (not shown) are rotatably supported in the middle and lower hook block parts 28, 26. The lower and middle hook block parts 26, 28 are therefore only connected to one another via the reeved hoist rope and change their relative distance during the lifting process. The lifting hook 14 is supported in a cushioned manner via a further spring mounting 12 in the lower hook block part 26. In this embodiment, both spring mountings 12, 12" are in turn implemented by mechanical springs 13, 13".

Figure 6:
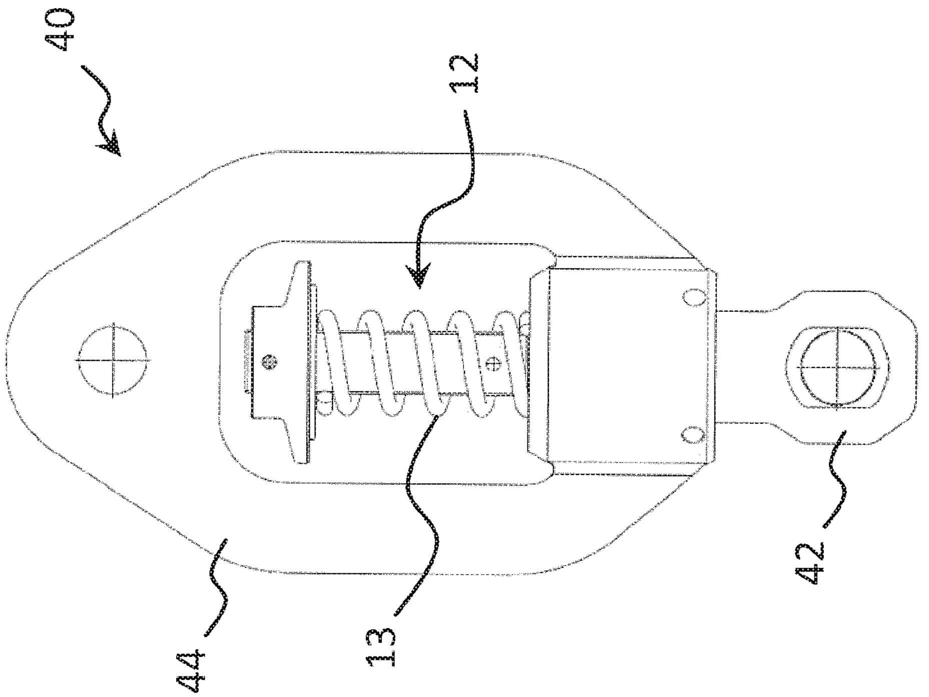
FIG. 6: an embodiment of a swivel of the lifting device in accordance with the invention in a side view.
Figure 7:
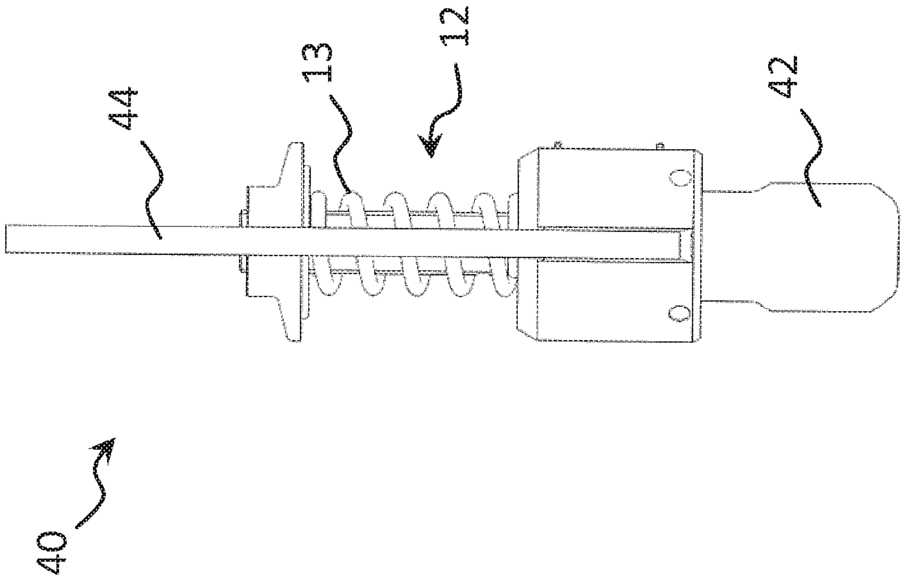
FIG. 7: the swivel in accordance with FIG. 6 in a frontal view.

Finally, in FIGS. 6 and 7, an embodiment of a swivel 20 of the lifting device in accordance with the invention is shown, in each case in a lateral and frontal view. The swivel comprises a first swivel part 42 that is rotatably supported in a second swivel part 44 and a spring mounting 12 that is arranged between the two swivel parts 42, 44.

REFERENCE NUMERAL LIST

10 load suspension means/hook block
10' load suspension means/hook block
10" load suspension means/hook block
12 spring mounting
12' spring mounting
12" spring mounting
13 spring
14 lifting hook
14' lifting hook
16 hook block body
16' hook block body
18 rope sheave
20 crossbeam
22 elongate hole
24 bolt
26 lower hook block part
28 middle hook block part
30 upper hook block part
40 swivel
42 first swivel part
44 second swivel part

The invention claimed is:

1. A lifting device for a crane comprising a hoist rope winch, a hoist rope, and a load suspension means (10), wherein the load suspension means (10) is connected to the hoist rope and is travelable by the hoist rope winch, the lifting device has at least one spring mounting (12) to cushion a load taken up by the load suspension means (10), and the spring mounting (12) is fixable by a latching mechanism.

2. The lifting device in accordance with claim 1, wherein the load suspension means (10) comprises a hook block and a lifting hook (14), with the lifting hook (14) being connected to the hook block (10) via the spring mounting (12).

3. The lifting device in accordance with claim 1, wherein the spring mounting (12) is arranged at or in the load suspension means (10).

4. The lifting device in accordance with claim 1, wherein the spring mounting (12) is arranged at a hoist rope anchor at the load suspension means (10), or at a load structure.

5. The lifting device in accordance with claim 4, wherein the spring mounting (12) is arranged at a fastening point of the hoist rope at the hoist rope winch.

6. The lifting device in accordance with claim 1, wherein the spring mounting (12) comprises a sensor for detecting the weight and/or a display of the weight of the load taken up by the load suspension means (10).

7. The lifting device in accordance claim 1 wherein the spring mounting (12) comprises a mechanical spring (13), an air cushioning, or a hydraulic cushioning.

8. A crane comprising a lifting device in accordance with claim 1.

9. The lifting device in accordance with claim 1, wherein the load suspension means (10) is vertically travelable by the hoist rope winch.

10. A lifting device for a crane comprising a hoist rope winch, a hoist rope, and a load suspension means (10), wherein the load suspension means (10) is connected to the hoist rope and is travelable by the hoist rope winch, the lifting device has at least one spring mounting (12) to cushion a load taken up by the load suspension means (10), and a swivel (40) is further provided, with the spring mounting (12) being arranged at or in the swivel (40).

11. The lifting device in accordance with claim 10, wherein the load suspension means (10) is vertically travelable by the hoist rope winch.

12. A lifting device for a crane comprising a hoist rope winch, a hoist rope, and a load suspension means (10), wherein the load suspension means (10) is connected to the hoist rope and is travelable by the hoist rope winch, the lifting device has at least one spring mounting (12) to cushion a bad taken up by the bad suspension means (10), and the spring mounting (12) is arranged at the hoist rope winch, with the spring mounting (12) being arranged between the hoist rope winch and a crane structure in a fastened state.

13. The lifting device in accordance with claim 12, wherein the load suspension means (10) is vertically travelable by the hoist rope winch.

14. The lifting device in accordance with claim 12, wherein the hoist rope winch is connectable to the crane structure of the crane.

* * * * *